US010683448B2

(12) United States Patent
Amanullah

(10) Patent No.: US 10,683,448 B2
(45) Date of Patent: Jun. 16, 2020

(54) ALKYL ESTER SPOTTING FLUID COMPOSITIONS FOR DIFFERENTIAL STICKING

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 312 days.

(21) Appl. No.: 15/231,281

(22) Filed: Aug. 8, 2016

(65) Prior Publication Data

US 2017/0226400 A1 Aug. 10, 2017

Related U.S. Application Data

(60) Provisional application No. 62/292,649, filed on Feb. 8, 2016.

(51) Int. Cl.
*C09K 8/36* (2006.01)
*C09K 8/34* (2006.01)
*E21B 31/03* (2006.01)

(52) U.S. Cl.
CPC .............. *C09K 8/36* (2013.01); *C09K 8/34* (2013.01); *E21B 31/03* (2013.01); *C09K 2208/02* (2013.01)

(58) Field of Classification Search
CPC ........... C09K 8/36; C09K 8/032; E21B 31/00; E21B 31/03
USPC ......................................................... 166/301
See application file for complete search history.

(56) References Cited

U.S. PATENT DOCUMENTS

| 3,761,410 A | 9/1973 | Mondshine et al. |
| 4,631,136 A | 12/1986 | Jones, III |
| 4,964,615 A | 10/1990 | Mueller et al. |
| 5,106,516 A | 4/1992 | Mueller et al. |
| 5,194,422 A | 3/1993 | Mueller et al. |

(Continued)

FOREIGN PATENT DOCUMENTS

| EP | 0461584 A2 | 12/1991 |
| EP | 0699729 A1 | 3/1996 |
| WO | 9520094 A1 | 7/1995 |
| WO | 02055627 A2 | 7/2002 |
| WO | 2006087505 A2 | 8/2006 |

OTHER PUBLICATIONS

"EZ Spot Pipe-Freeing Agent" accessible as of Aug. 8, 2016 at the website: http://www.halliburton.com/public/bar/contents/Data_Sheets/web/Product_Data_Sheets/D_through_G/EZ_SPOT.pdf; pp. 1-2.

(Continued)

*Primary Examiner* — Angela M DiTrani Leff
*Assistant Examiner* — Ashish K Varma
(74) *Attorney, Agent, or Firm* — Bracewell LLP; Constance G. Rhebergen; Brian H. Tompkins

(57) ABSTRACT

Alkyl ester spotting fluid compositions and processes for freeing differentially stuck pipe are provided. An alkyl ester spotting fluid composition includes an invert emulsion having an alkyl ester as the external phase and water as the internal phase. In some embodiments, the alkyl ester spotting fluid composition may include the alkyl ester invert emulsion and an emulsifier. The alkyl ester spotting fluid composition may be introduced downhole in the vicinity of a portion of a differentially stuck pipe such that the spotting fluid composition contacts the mudcake and frees the differentially stuck pipe.

9 Claims, 14 Drawing Sheets

(56) References Cited

U.S. PATENT DOCUMENTS

| | | | |
|---|---|---|---|
| 5,318,954 A | 6/1994 | Mueller et al. | |
| 5,318,956 A | 6/1994 | Mueller et al. | |
| 5,707,940 A | 1/1998 | Bush et al. | |
| 5,807,811 A * | 9/1998 | Malchow, Jr. | B01F 17/0021 507/128 |
| RE36,066 E | 1/1999 | Mueller et al. | |
| 5,888,944 A * | 3/1999 | Patel | C09K 8/32 166/300 |
| 6,435,276 B1 * | 8/2002 | Kercheville | C09K 8/02 166/255.1 |
| 6,589,917 B2 * | 7/2003 | Patel | C09K 8/32 507/138 |
| 6,662,871 B2 | 12/2003 | Kercheville et al. | |
| 6,984,611 B2 | 1/2006 | Kercheville et al. | |
| 7,150,321 B2 | 12/2006 | Luke et al. | |
| 7,231,976 B2 * | 6/2007 | Berry | C09K 8/40 166/291 |
| 8,071,510 B2 * | 12/2011 | Scoggins | C09K 8/035 166/270.1 |
| 8,091,644 B2 * | 1/2012 | Clark | C09K 8/52 166/305.1 |
| 2014/0005079 A1 | 1/2014 | Dahanayake et al. | |

OTHER PUBLICATIONS

"Pipe-Lax OB" accessible as of Aug. 8, 2016 at the website: http://www.slb.com/~/media/Files/miswaco/product_sheets/pipe_lax_ob.pdf; pp. 1-2.

"Pipe-Lax W (Export)" accessible as of Aug. 8, 2016 at the website: http://www.slb.com/services/drilling/drilling_fluid/df_products/~/media/Files/miswaco/product_sheets/pipe-lax_w_export.ashx; pp.

Krol, David Alan; "Laboratory Evaluation of Stuck Pipe Spotting Fluid" Society of Petroleum Engineers of AIME; SPE 10096; 56th Annual Fall Technical Conference and Exhibition of the Society of Petroleum Engineers of AIME, held in San Antonio, Texas, Oct. 5-7, 1981; pp. 1-13.

International Search Report and Written Opinion for related PCT application PCT/2017/016764 (SA5488/PCT) dated May 15, 2017; 11 pages.

Itoh Oil Chemicals Co., Ltd.; "Castor Oil Derivatives" available as of Oct. 7, 2019 at the website: http://www.itoh-oilchem.co.jp/english/pdct02.html; pp. 1-3.

PubChem "Castor oil; Absorption, Distribution and Excretion" available as of Oct. 7, 2019 at the website: https://pubchem.ncbi.nlm.nih.gov/compound/Castor-oil; pp. 1-2.

* cited by examiner

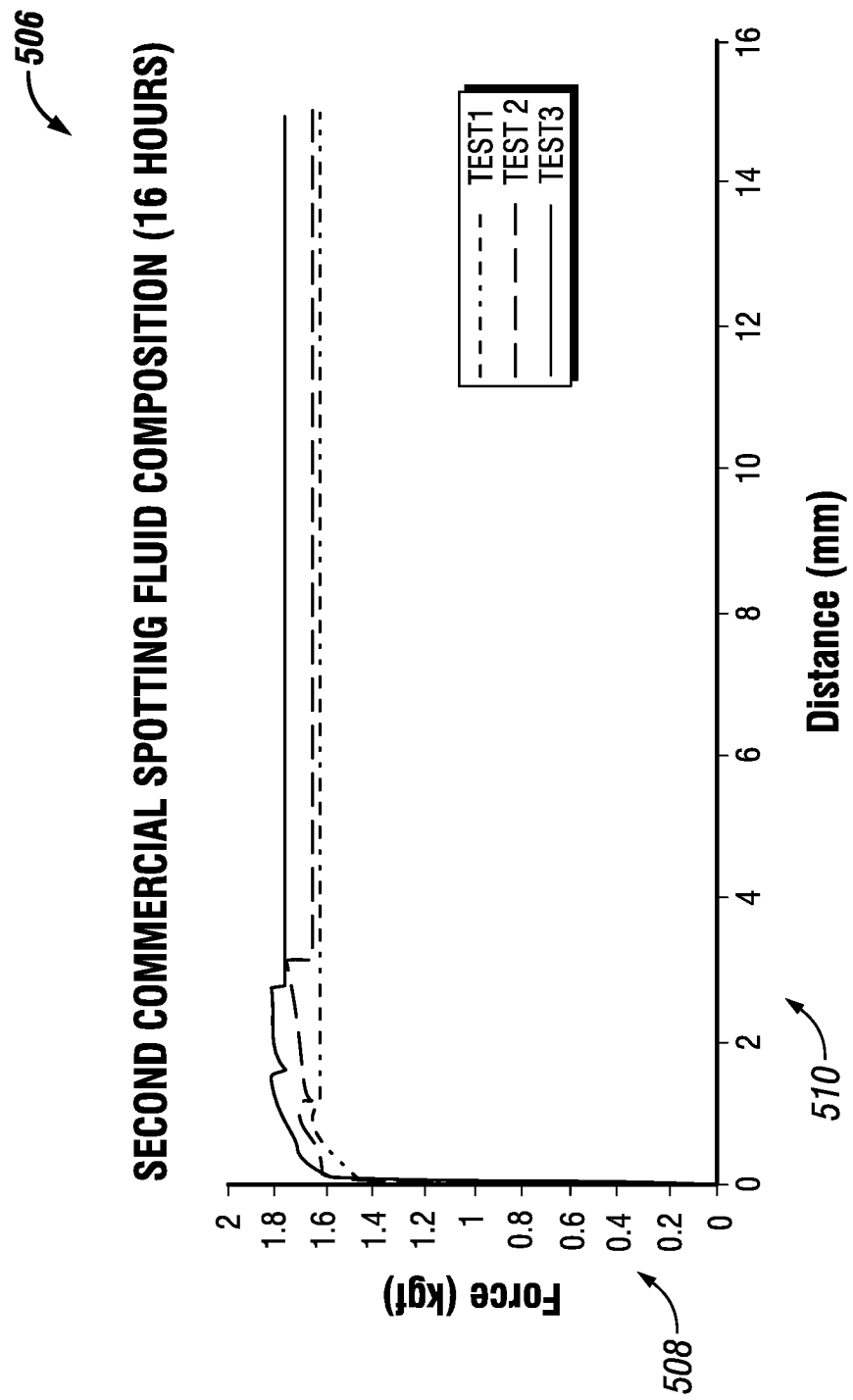

ALKYL ESTER SPOTTING FLUID COMPOSITIONS FOR DIFFERENTIAL STICKING

CROSS-REFERENCE TO RELATED PATENT APPLICATIONS

This application claims priority from U.S. Provisional Application No. 62/292,649 filed Feb. 8, 2016, and titled "ALKYL ESTER SPOTTING FLUID COMPOSITIONS FOR DIFFERENTIAL STICKING." For purposes of United States patent practice, this application incorporates the contents of the Provisional application by reference in its entirety.

BACKGROUND

Field of the Disclosure

Embodiments of the disclosure generally relate to downhole treatment fluids and, more specifically, spotting fluids used to free differentially stuck pipe in a well.

Description of the Related Art

Drilling and production systems are employed to access and extract hydrocarbons from hydrocarbon reservoirs in geologic formations. During the course of drilling a well, pipe inserted into the well may become stuck such that the pipe is unable to be rotated or reciprocated. Differentially stuck pipe, such as a drill string or casing, occurs when a pressure differential across a permeable zone of the formation causes a vacuum seal which locks the drill string or casing in place. In some instances, lubrication fluids, dehydrating agents such as anhydrous glycols, and acids, either alone or in combination, may be used in an attempt to free the differentially stuck pipe. For example, dehydrating agents may be used to dehydrate the filter cake to assist in relive pressure and break the vacuum seal against the permeable zone of the formation.

SUMMARY

Spotting fluids may be used to free differentially stuck pipe (for example, drill string or casing) in a well. Pipe inserted in a wellbore may become sealed against a geologic formation due to the buildup of material (for example, a filter cake) around a portion of the pipe. A spotting fluid is introduced to remove or reduce this seal and free the stuck pipe. However, preparation and use of existing spotting fluids may be time-consuming and require hours of soak time to be effective. Some spotting fluids may use corrosive fluids to reduce or remove the seal of the filter and may not be readily biodegradable, and the use of such spotting fluids may require removal from the mud system after recovering stuck pipe.

In some embodiments, a spotting fluid composition for freeing differentially stuck pipe in a well is disclosed. The spotting fluid composition includes an emulsifier and an invert emulsion that includes an external phase having an alkyl ester produced from the esterification of a vegetable oil and an internal phase having water. In some embodiments, the alkyl ester includes at least one of an oleic sunflower oil ester, a canola oil ester, a jojoba oil ester, and a castor oil ester. In some embodiments, the invert emulsion consists of the external phase having the alkyl ester and the internal phase having water. In some embodiments, the external phase consists of the alkyl ester and the internal phase consists of water. In some embodiments, the volumetric ratio of the alkyl ester to water is in a range of 95:5 to 60:40. In some embodiments, the emulsifier is at least 8% by volume. In some embodiments, the alkyl ester is at least 60% by volume, the emulsifier is at least 8% by volume, and water is no more than 32% by volume. In some embodiments, the spotting fluid composition includes a weighting agent. In some embodiments, the weighting agent includes at least one of barite, calcium carbonate, and hausmannite ore.

In some embodiments, a method of freeing a differentially stuck pipe is disclosed. The method includes introducing a spotting fluid composition in the vicinity of a portion of differentially stuck pipe, such that the spotting fluid contacts a material surrounding the portion of differentially stuck pipe. The spotting fluid composition includes an emulsifier and an invert emulsion that includes an external phase having an alkyl ester produced from the esterification of a vegetable oil and an internal phase having water. In some embodiments, the alkyl ester includes at least one of an oleic sunflower oil ester, a canola oil ester, a jojoba oil ester, or a castor oil ester. In some embodiments, the invert emulsion consists of the external phase having the alkyl ester and the internal phase having water. In some embodiments, the external phase consists of the alkyl ester and the internal phase consists of water. In some embodiments, the method includes allowing the spotting fluid composition to interact with the material surrounding the portion of differentially stuck pipe over a time period. In some embodiments, the method includes adding the spotting fluid composition to a mud system configured to circulate a drilling mud. In some embodiment, the spotting fluid compositing is added to the mud system in a range of 2% to 4% by volume. In some embodiments, the method also includes recovering the stuck pipe and retaining the spotting fluid composition in the mud system after recovering the stuck pipe. In some embodiments, the volumetric ratio of the alkyl ester to water of the invert emulsion is in the range of 95:5 to 60:40. In some embodiments, the emulsifier is at least 8% by volume. In some embodiments, the alkyl ester is at least 60% by volume, the emulsifier is at least 8% by volume, and water is no more than 32% by volume. In some embodiments, the spotting fluid composition includes a weighting agent. In some embodiments, the weighting agent includes at least one of barite, calcium carbonate, and hausmannite ore.

In some embodiments a method of forming a spotting fluid composition for freeing differentially stuck pipe is provided. The method includes preparing an invert emulsion that includes an external phase having an alkyl ester produced from the esterification of a vegetable oil and an internal phase having water. The method also includes adding an emulsifier to the invert emulsion to form the spotting fluid composition. In some embodiments, the alkyl ester includes at least one of an oleic sunflower oil ester, a canola oil ester, a jojoba oil ester, or a castor oil ester. In some embodiments, the invert emulsion consists of the external phase having the alkyl ester and the internal phase having water. In some embodiments, the external phase consists of the alkyl ester and the internal phase consists of water. In some embodiments, the volumetric ratio of the alkyl ester to water is in a range of 95:5 to 60:40. In some embodiments, the emulsifier is at least 8% by volume. In some embodiments, the alkyl ester is at least 60% by volume, the emulsifier is at least 8% by volume, and water is no more than 32% by volume. In some embodiments, the spotting fluid composition includes a weighting agent. In some embodiments, the weighting agent includes at least one of barite, calcium carbonate, and hausmannite ore.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

FIGS. 5A and 5B are graphs of the pulling force vs. displacement for unsticking the spherical foot from the mudcake in the presence of a second commercial spotting fluid composition;

DETAILED DESCRIPTION

Figure 1:
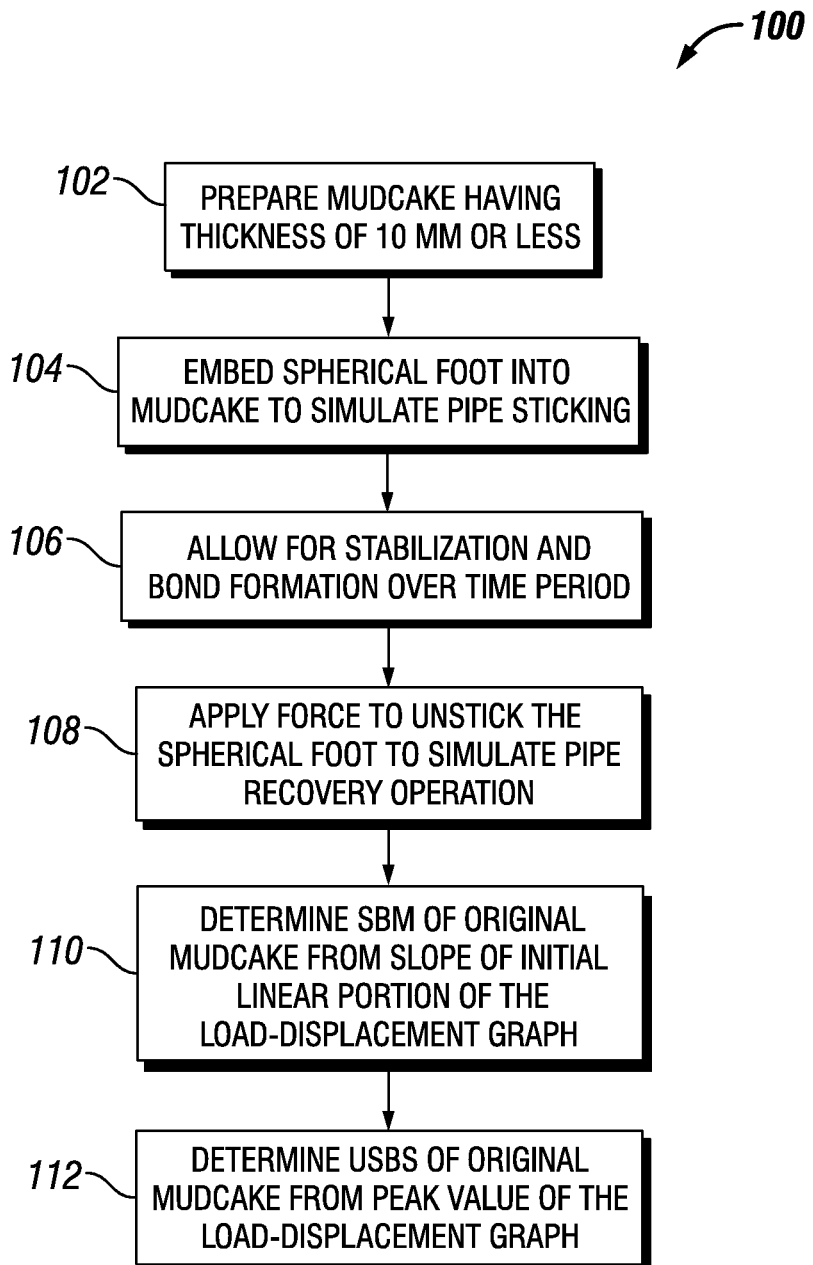
FIG. 1 is a flowchart of a process for determining the sticking bond modulus (SBM) and ultimate sticking bond strength (USBS) of a mudcake before interaction with any spotting fluid.

The present disclosure will now be described more fully with reference to the accompanying drawings, which illustrate embodiments of the disclosure. This disclosure may, however, be embodied in many different forms and should not be construed as limited to the illustrated embodiments set forth in the disclosure. Rather, these embodiments are provided so that this disclosure will be thorough and complete, and will fully convey the scope of the disclosure to those skilled in the art.

The present disclosure includes compositions for use as spotting fluids and methods to free differentially stuck pipe in a well. The spotting fluid compositions and methods described in this disclosure may free differentially stuck pipe by removing or reducing the seal against a formation by material (for example, a mudcake, also referred to as a "filter cake") around the differentially stuck pipe.

The present disclosure includes alkyl ester spotting fluid compositions having an alkyl ester invert emulsion. In some embodiments, the alkyl ester may be a vegetable ester derived from vegetable material. As used herein, the term "vegetable ester" refers to an ester produced by esterification of a vegetable oil. In some embodiments, the vegetable ester can be produced from a vegetable oil such as sunflower oil, jojoba oil, canola oil, castor oil, palm oil, soybean oil, or other suitable oils. Accordingly, in some embodiments, the alkyl ester can include an oleic sunflower oil ester (for example, a low oleic sunflower oil ester (70% or less oleic acid) or a high oleic sunflower oil ester (greater than 70% oleic acid)), a canola oil ester, a jojoba oil ester, or a castor oil ester. In some embodiments, the alkyl ester is produced from a complete esterification of a vegetable oil. In some embodiments, the alkyl ester is produced from a complete esterification of sunflower oil (for example, a high oleic sunflower oil). In some embodiments, the alkyl ester is produced by reacting high oleic sunflower oil with methyl alcohol in the presentence of a sodium hydroxide (NaOH) catalyst.

In some embodiments, an alkyl ester spotting fluid composition may be formed from an invert emulsion having an alkyl ester as the external phase and water (for example, freshwater or seawater) as the internal phase. In some embodiments, the alkyl ester spotting fluid composition may include the alkyl ester invert emulsion and an emulsifier. In some embodiments, the spotting fluid composition may also include a weighting agent.

In some embodiments, the alkyl ester spotting fluid composition may be introduced downhole in the vicinity of a differentially stuck pipe. In some embodiments, the alkyl ester spotting fluid composition may be allowed to soak for a time period, to affect (for example, weaken, damage, and degrade) the bonds between the mudcake and the stuck pipe.

Examples

The following examples are included to demonstrate embodiments of the disclosure. It should be appreciated by those of skill in the art that the techniques and compositions disclosed in the example which follows represents techniques and compositions discovered by the inventors to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of an alkyl ester spotting fluid composition was tested and compared against two commercial spotting formulations. The tested spotting fluid composition includes an invert emulsion having an alkyl ester as the external phase and freshwater as the internal phase, and an emulsifier. In the example described infra, the alkyl ester is a high oleic sunflower oil ester (greater than 70% oleic acid), and the emulsifier is EZ Spot® manufactured by Halliburton of Houston, Tex., USA.

Table 1 shows example spotting fluid compositions for use in the field (in the amount of 100 barrels (bbl)) and the laboratory (in the amount of 350 cubic centimeters (cc)):

TABLE 1

Compositions of Field and Laboratory Spotting Fluids

| Components | Field Formulation (bbl) | Concentration (volume %) | Lab Formulation (cc) |
|---|---|---|---|
| Alkyl Ester | 64 | 64 | 224 |
| EZ Spot® | 8 | 8 | 28 |
| Water | 28 | 28 | 98 |
| Total Volume | 100 | | 350 |

The alkyl ester spotting fluid composition was tested against a first commercial spotting fluid that included the EZ Spot® commercial pipe-freeing agent. The first commercial spotting fluid compositions for use in the field (in the amount of 100 barrels (bbl)) and the laboratory (in the amount of 350 cubic centimeters (cc)) are shown in Table 2:

TABLE 2

Formulation of First Commercial Spotting Fluid

| Components | Field Formulation (bbl) | Concentration (volume %) | Lab Formulation (cc) |
|---|---|---|---|
| Diesel | 64 | 64 | 224 |
| EZ-Spot® | 8 | 8 | 28 |
| Water | 28 | 28 | 98 |
| Total Volume | 100 | | 350 |

The spotting fluid composition was also tested against a second commercial spotting fluid that included the Pipe-Lax® commercial additive manufactured by M-I Swaco of Pleasanton, Tex., USA. The second commercial spotting fluid compositions for use in the field (in the amount of 100 bbl) and the laboratory (in the amount of 350 cc) are shown in Table 3:

TABLE 3

Formulation of Second Commercial Spotting Fluid

| Components | Field Formulation (bbl) | Concentration (volume %) | Lab Formulation (cc) |
|---|---|---|---|
| Diesel | 64 | 64 | 224 |
| Pipe-Lax | 8 | 8 | 28 |
| Water | 28 | 28 | 98 |
| Total Volume | 100 | | 350 |

The alkyl ester spotting fluid composition, the first commercial spotting fluid, and the second commercial spotting fluid were tested using a simulation of various elements of pipe sticking and stuck pipe recovery operation using a sample potassium chloride (KCl)-polymer mudcake.

Initially, the sticking bond modulus (SBM) and ultimate sticking bond strength (USBS) of the mudcake were determined before interaction with any spotting fluid. FIG. 1 depicts a process 100 for determining the SBM and USBS of a mudcake before interaction with any spotting fluid. Initially, the mudcake having a thickness of 10 millimeters (mm) or less was prepared (block 102). Next, a spherical foot was embedded into the mudcake to simulate pipe sticking (block 104). The spherical foot and mudcake were allowed to stabilize and form bonds over a time period of two minutes (block 106).

A pulling force was then applied to unstick the spherical foot and similar a pipe recovery operation (block 108) and a force-displacement graph was generated. The SBM of the original mudcake was determined from the slope of the initial linear portion of the force-displacement graph (block 110). Additionally, the USBS of the original mudcake was determined from the peak value of the force-displacement graph (block 112).

Figure 2:
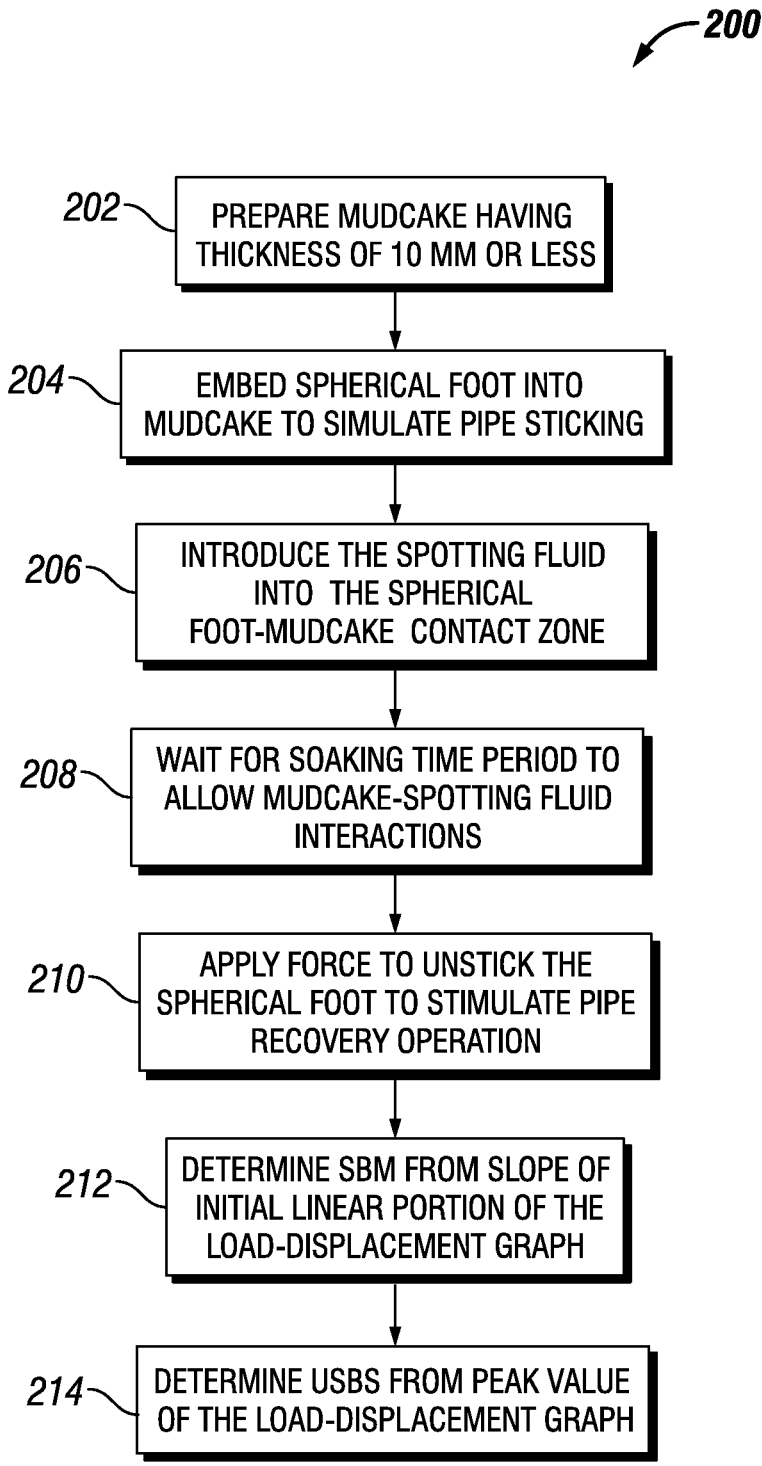
FIG. 2 is a flowchart of a process for determining the sticking bond modulus and ultimate sticking bond strength of a mudcake after interaction with a spotting fluid composition.

After determining the SBM and USBS of the mudcake before interaction with any spotting fluid, the SBM and USBS using the spotting fluid composition, the first commercial spotting fluid, and the second commercial fluid to unstick the mudcake were determined. FIG. 2 depicts a process 200 for determining the SBM and USBS of a mudcake after interaction with the example alkyl ester spotting fluid composition and the commercial spotting fluid compositions. Initially, the mudcake having a thickness of 10 millimeters (mm) or less was prepared (block 202). Next, a spherical foot was embedded into the mudcake to simulate pipe sticking (block 204). One of the tested spotting fluids was then introduced into the spherical foot-mudcake contact zone (block 206). The mudcake and spotting fluid were allowed to interact over a soaking time period (block 208).

A pulling force was then applied to unstick the spherical foot and similar a pipe recovery operation (block 210) and a force-displacement graph was generated. The SBM associated with the tested spotting fluid was determined from the slope of the initial linear portion of the force-displacement graph (block 212). Additionally, the USBS associated with the tested spotting fluid was determined from the peak value of the force-displacement graph (block 214).

Figure 3:
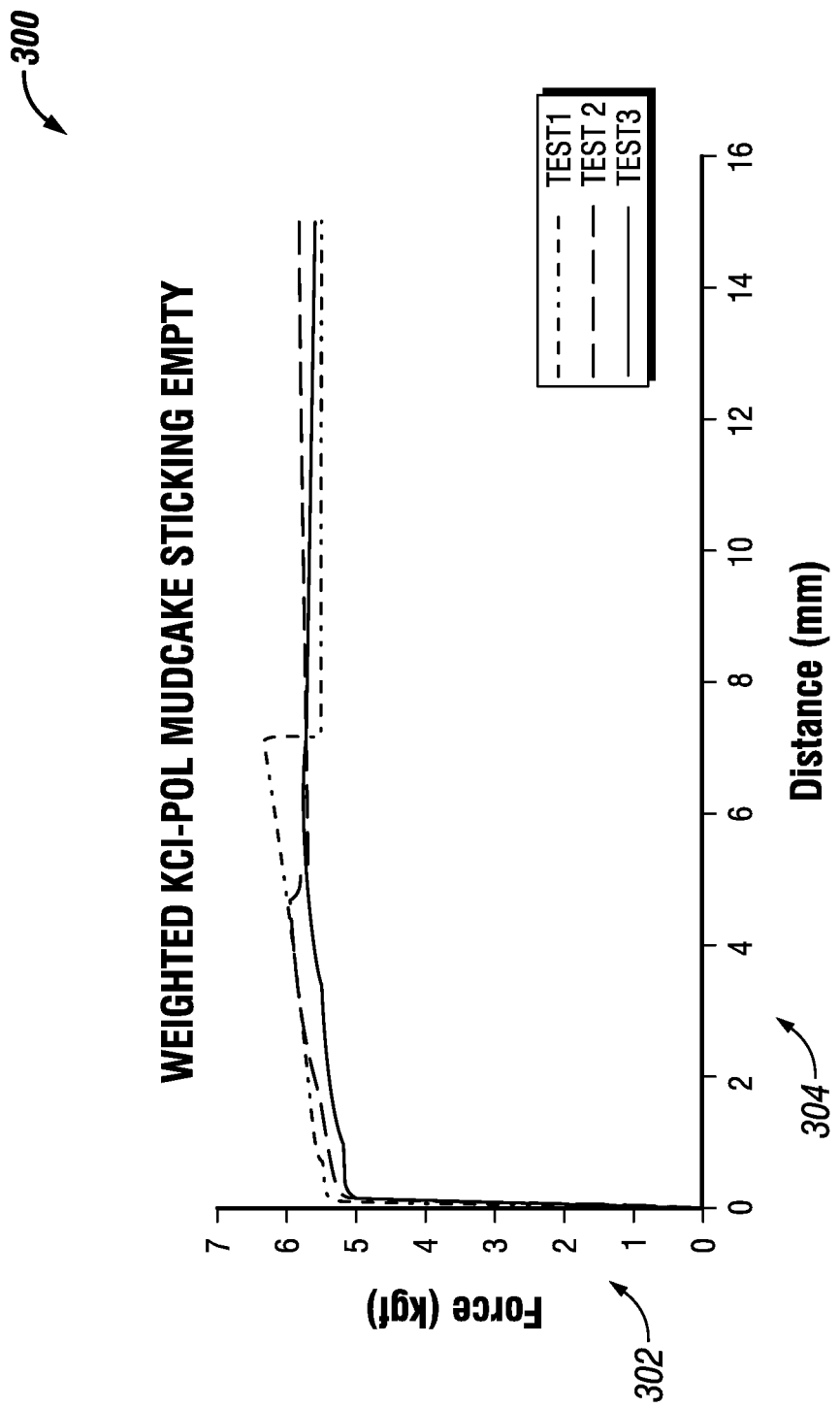
FIG. 3 is a graph of the pulling force versus (vs.) displacement for unsticking the spherical foot from the mudcake without interaction with a spotting fluid.

According to the procedures described supra, FIGS. 3-6 depict various graphs of the pulling force (in kilogram-force (kgf)) vs. displacement (in mm) for the original mudcake without interaction with spotting fluid, the first commercial spotting fluid composition, and the second commercial spotting fluid composition, the alkyl ester spotting fluid composition. Thus, FIGS. 3-6 each show a force-displacement curve generated during the testing procedure described supra. For example, FIG. 3 shows a force-displacement curve without interaction with a spotting fluid, FIGS. 4A and 4B show force-displacement curves associated with the first commercial spotting fluid composition, FIGS. 5A and 5B show force-displacement curves associated with the second commercial spotting fluid composition, and FIGS. 6A and 6B show load displacement curves associated with the/alkyl ester spotting fluid composition. The humps and variations in the force-displacement curves may correspond to momentary build-ups and failures of sticking bonds due to weak points and links between the spherical foot and the mudcake.

Figure 4A:
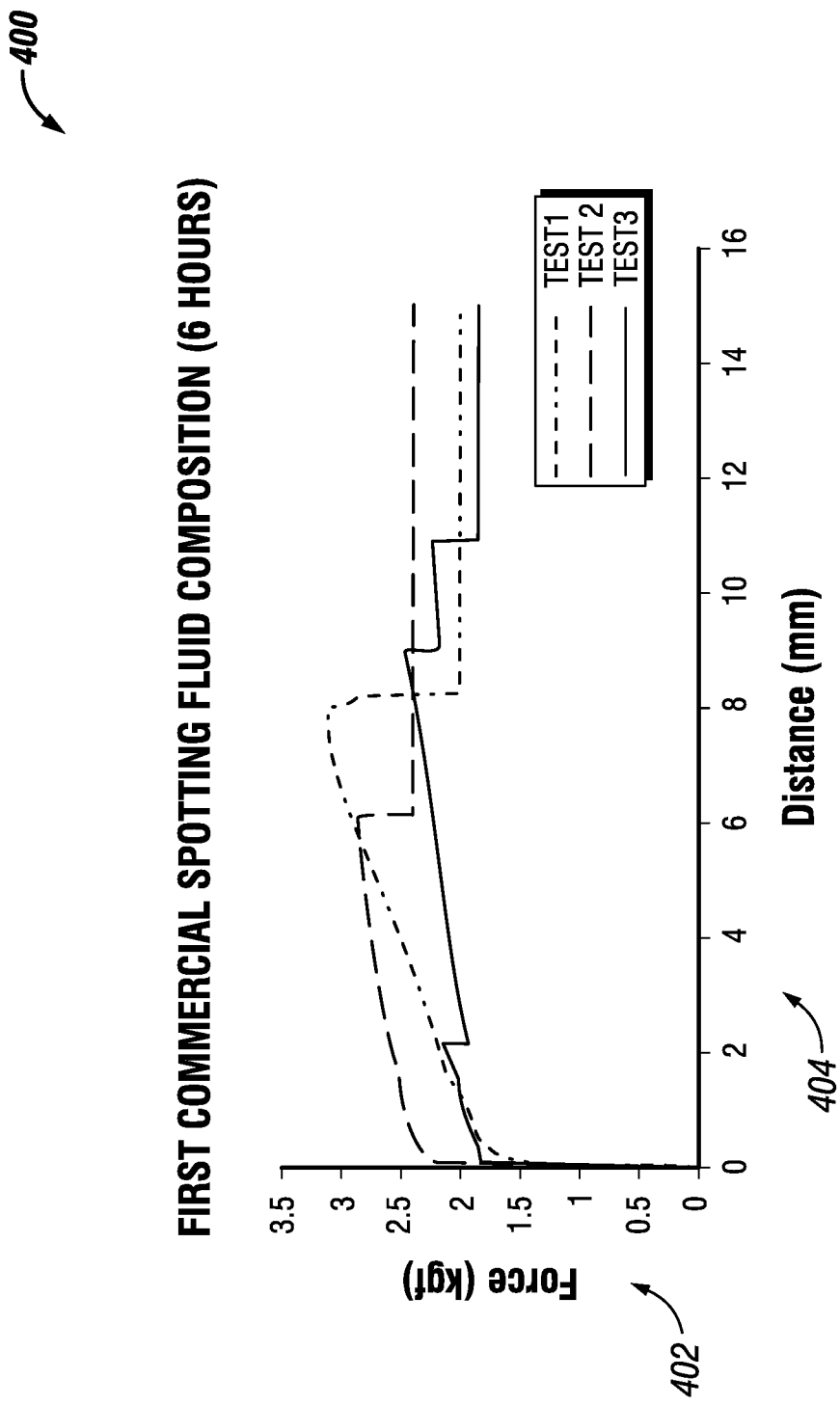
FIGS. 4A and 4B are graphs of the pulling force vs. displacement for unsticking the spherical foot from the mudcake in the presence of a first commercial spotting fluid composition.
Figure 4B:
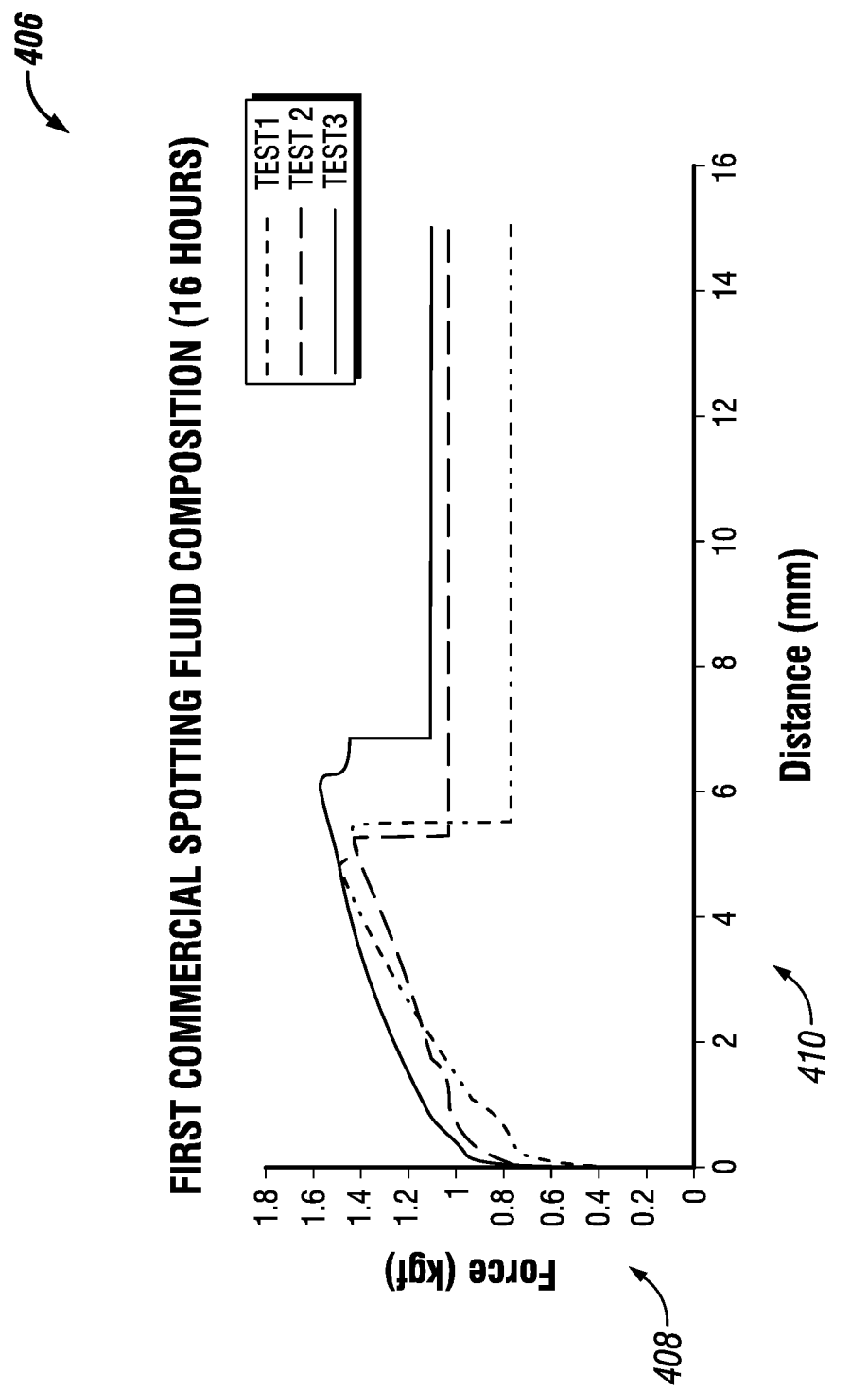

FIG. 3 depicts a graph 300 of the pulling force (as shown on the x-axis 302) vs. displacement (as shown on the y-axis 304) for unsticking the spherical foot from the mudcake without interaction with a spotting fluid. The plot 300 depicts three force displacement curves that correspond to three tests conducted on the mudcake without interaction with a spotting fluid. As shown in FIG. 3, unsticking the spherical foot from the mudcake without interaction with a spotting fluid requires at least 5 kgf of force. The average USBS determined from the peaks of the three force-displacement curves is about 6.014. The average SBM determined from the slopes of the initial linear portions of the three force-displacement curves shown in FIG. 3 is about 38.241 kgf/mm FIGS. 4A and 4B depict various graphs of the pulling force vs. displacement for unsticking the spherical foot from the mudcake in the presence of the first commercial spotting fluid composition. FIG. 4A depicts a plot 400 of the pulling force (as shown on the x-axis 402) vs. displacement (as shown on the y-axis 404) after a soaking time period of six hours. The plot 400 depicts three force-displacement curves that correspond to three tests conducted using a mudcake and the first commercial spotting fluid composition. As shown in FIG. 4A, unsticking the spherical foot from the mudcake after soaking with the first commercial spotting fluid composition for a time period of 6 hours requires at least about 2.5-3 kgf of force. The average USBS determined from the peaks of the three force-displacement curves of FIG. 4A is about 2.81. The average SBM determined from the slopes of the initial linear portions of the three force-displacement curves shown in FIG. 4A is about 33.92 kgf/mm.

Figure 5A:
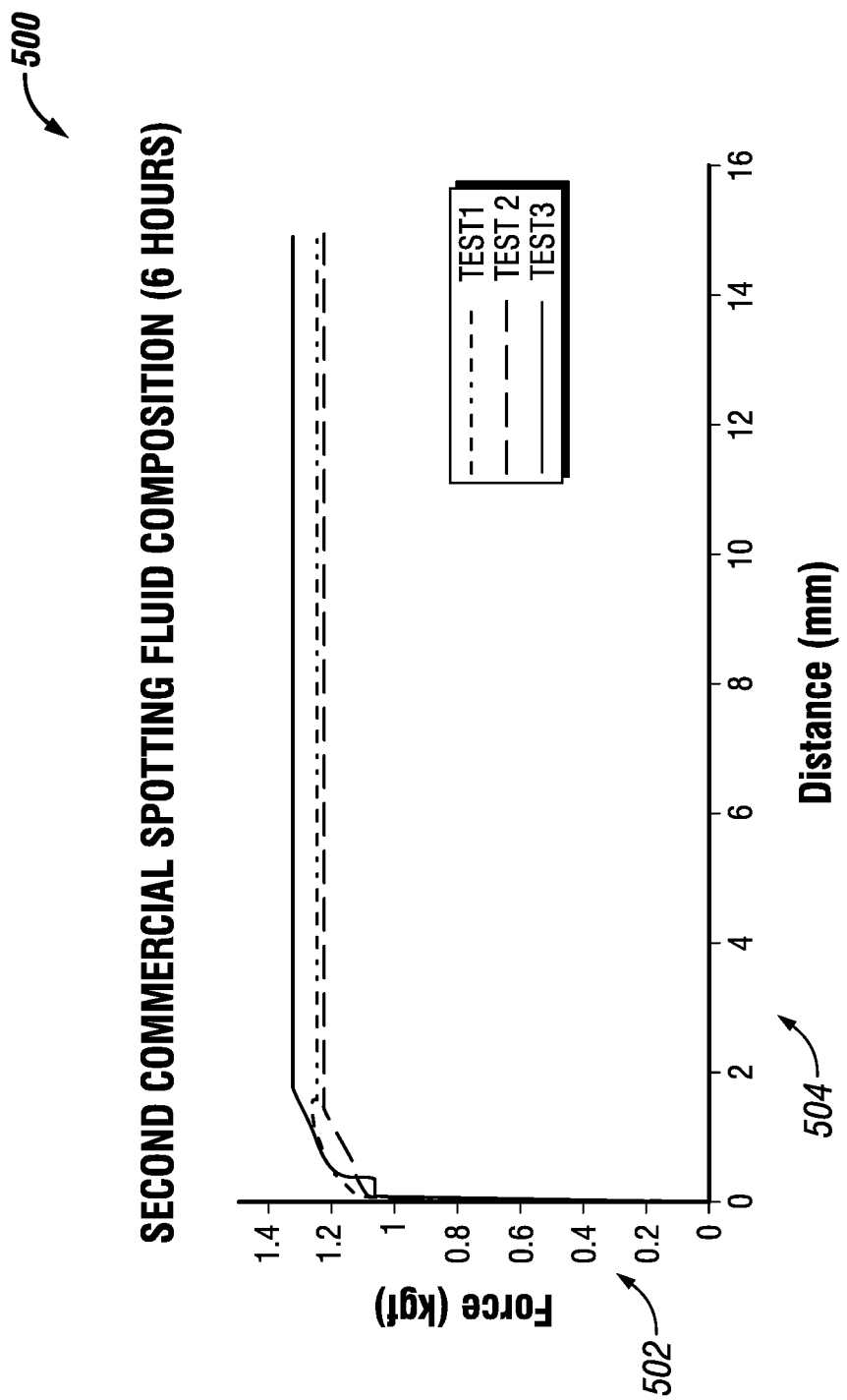

Similarly, FIG. 4B depicts a plot 406 of the pulling force (as shown on the x-axis 408) vs. displacement (as shown on the y-axis 410) after a soaking time period of sixteen hours. Here again, the plot 406 depicts three force-displacement curves that correspond to three tests conducted using a mudcake and the first commercial spotting fluid composition. As shown in FIG. 4B, unsticking the spherical foot from the mudcake after soaking with the first commercial spotting fluid composition for a time period of 16 hours requires at least about 1.4-1.6 kgf of force. The average USBS determined from the peaks of the three force-displacement curves of FIG. 4B is about 1.497, and the average SBM determined from the slopes of the initial linear portions of the three force-displacement curves shown in FIG. 4B is about 22.276 kgf/mm FIGS. 5A and 5B depict various plot of the pulling force vs. displacement for unsticking the spherical foot from the mudcake in the presence of the second commercial spotting fluid composition. FIG. 5A depicts a plot 500 of the pulling force (as shown on the x-axis 502) vs. displacement (as shown on the y-axis 504) after a soaking time period of six hours. The plot 500 depicts three force-displacement curves that correspond to three tests conducted using a mudcake and the second commercial spotting fluid composition. As shown in FIG. 5A, unsticking the spherical foot from the mudcake after soaking with the second commercial spotting fluid composition for a time period of 6 hours requires at least about 1.2-1.3 kgf of force. The average USBS determined from the peaks of the three force-displacement curves of FIG. 5A is about 1.272. The average SBM determined from the slopes of the initial linear portions of the three force-displacement curves shown in FIG. 5A is about 22.678 kgf/mm.

Similarly, FIG. 5B depicts a plot 506 of the pulling force (as shown on the x-axis 508) vs. displacement (as shown on the y-axis 510) after a soaking time period of sixteen hours. The plot 506 thus depicts three force-displacement curves that correspond to three tests conducted using a mudcake and the first commercial spotting fluid composition. As shown in FIG. 5B, unsticking the spherical foot from the mudcake after soaking with the second commercial spotting fluid composition for a time period of 16 hours requires at least about 1.6-1.8 kgf of force. The average USBS determined from the peaks of the three force-displacement curves of FIG. 5B is about 1.745, and the average SBM determined from the slopes of the initial linear portions of the three force-displacement curves shown in FIG. 5B is about 30.427 kgf/mm.

Figure 6A:
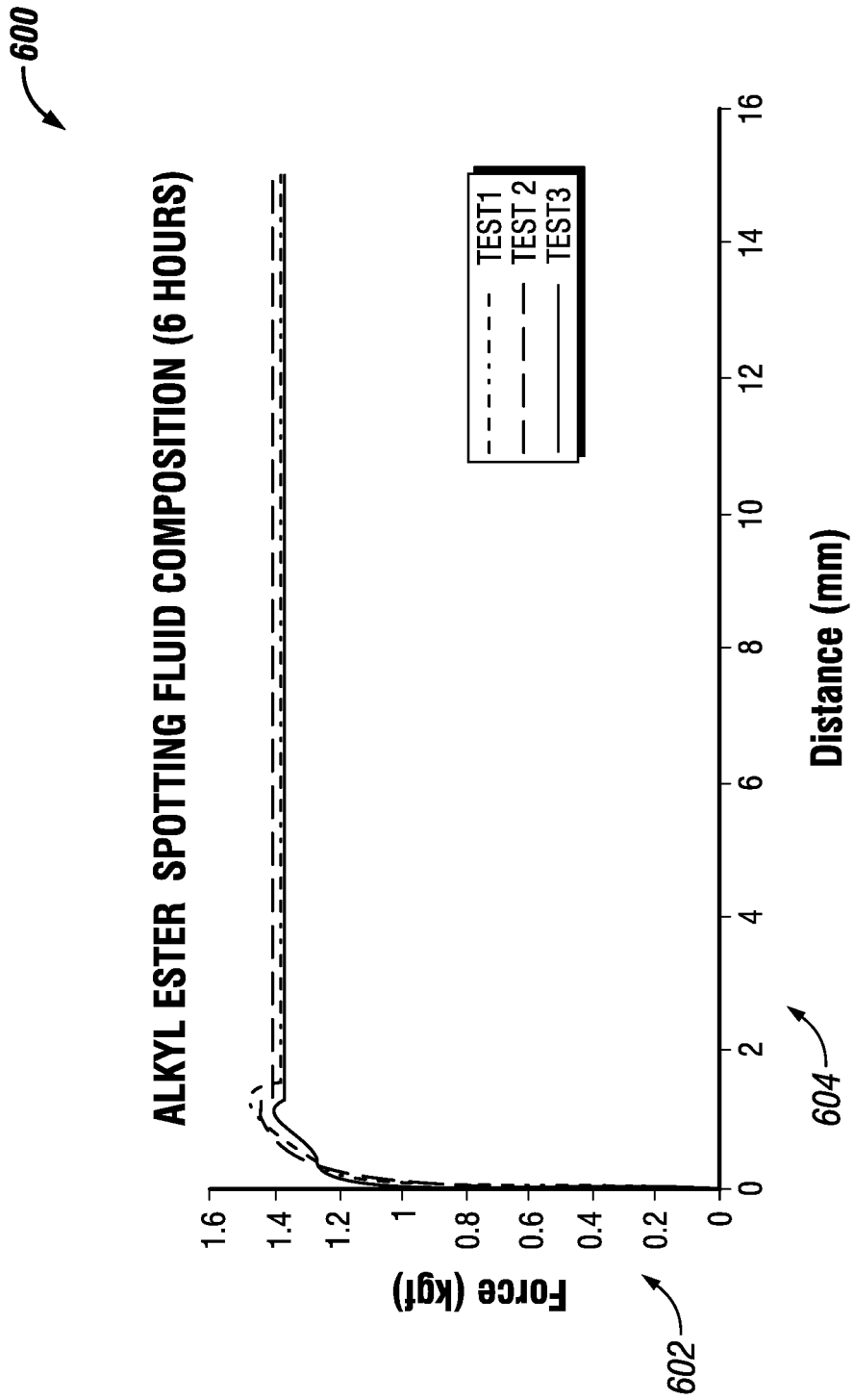
FIGS. 6A and 6B are graphs of the pulling force vs. displacement for unsticking the spherical foot from the mudcake in the presence of an alkyl ester spotting fluid composition.
Figure 6B:
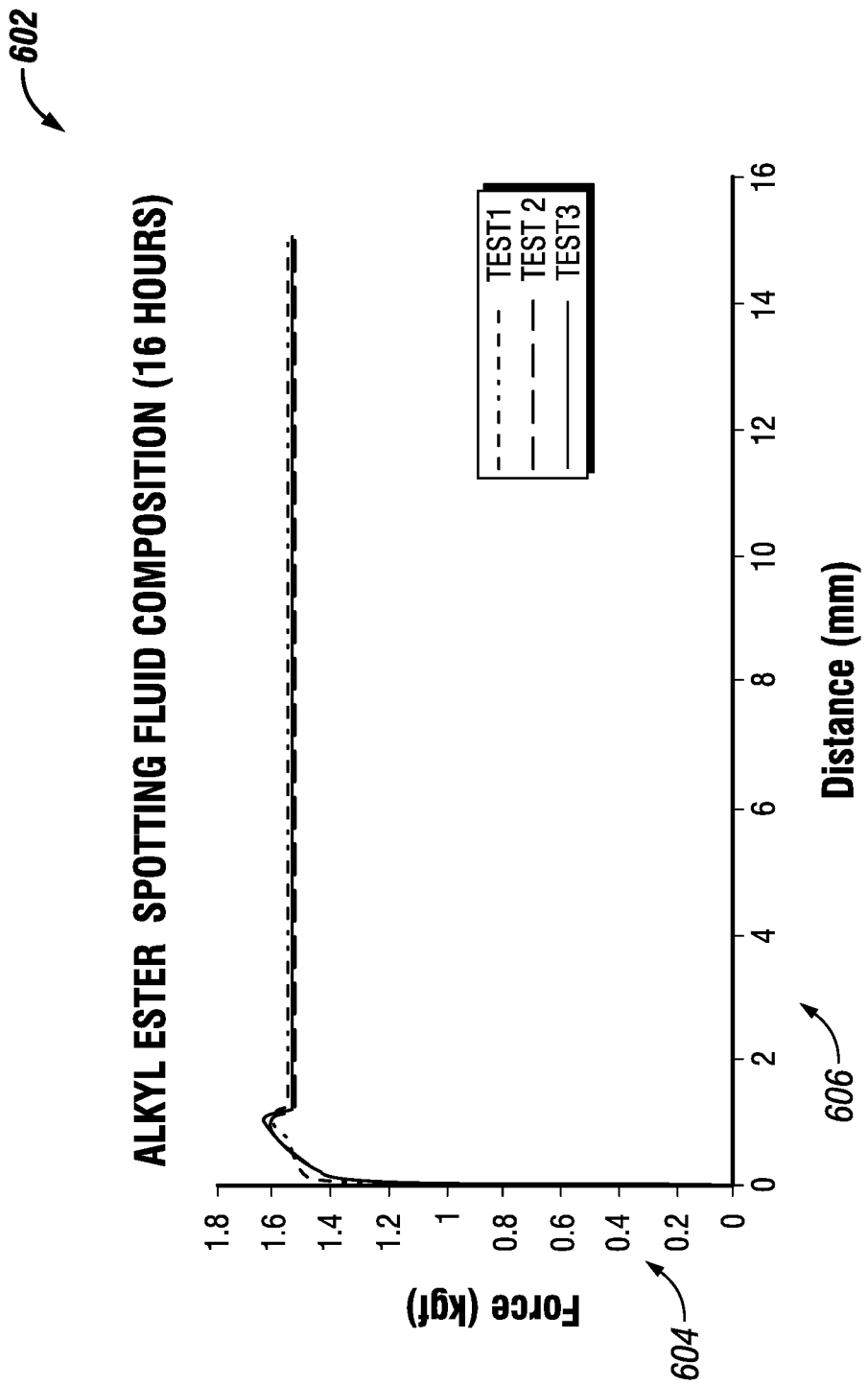

Finally, FIGS. 6A and 6B depict various plot of the pulling force vs. displacement for unsticking the spherical foot from the mudcake in the presence of the alkyl ester spotting fluid composition. FIG. 6A depicts a plot 600 of the pulling force (as shown on the x-axis 602) vs. displacement (as shown on the y-axis 604) after a soaking time period of six hours. The plot 600 depicts three force-displacement curves that correspond to three tests conducted using a mudcake and the second commercial spotting fluid composition. As shown in FIG. 6A, unsticking the spherical foot from the mudcake after soaking with the alkyl ester spotting fluid composition for a time period of 6 hours requires at least about 1.4-1.5 kgf of force. The average USBS determined from the peaks of the three force-displacement curves of FIG. 6A is about 1.447. The average SBM determined from the slopes of the initial linear portions of the three force-displacement curves shown in FIG. 6A is about 25.878 kgf/mm.

FIG. 6B depicts a plot 606 of the pulling force (as shown on the x-axis 608) vs. displacement (as shown on the y-axis 610) after a soaking time period of sixteen hours. Thus, the plot 606 thus depicts three force-displacement curves that correspond to three tests conducted using a mudcake and the first commercial spotting fluid composition. As shown in FIG. 6B, unsticking the spherical foot from the mudcake after soaking with the alkyl ester commercial spotting fluid composition for a time period of 16 hours requires at least about 1.6 kgf of force. The average USBS determined from the peaks of the three force-displacement curves of FIG. 6B is about 1.614, and the average SBM determined from the slopes of the initial linear portions of the three force-displacement curves shown in FIG. 6B is about 26.361 kgf/mm.

Tables 4-10 depict the SBM and USBS values for unsticking the mudcake without interaction with a spotting fluid, for unsticking the spherical foot from the mudcake in the presence of the first commercial spotting fluid composition, for unsticking the spherical foot from the mudcake in the presence of the second commercial spotting fluid composition, and for unsticking the mudcake in the presence of the alkyl ester spotting fluid composition, as derived from the graphs illustrated in FIGS. 4-6 and described supra.

Table 4 depicts the SBS and USBS for unsticking the mudcake without interaction with a spotting fluid:

TABLE 4

SBS and USBS for the mudcake without interaction with a spotting fluid

| | Fit | SBM (kgf/mm) | USBS (kgf) |
| --- | --- | --- | --- |
| Test 1 | 0.999 | 40.732 | 6.347 |
| Test 2 | 0.997 | 36.927 | 5.933 |
| Test 3 | 0.997 | 37.065 | 5.761 |
| Average | 0.998 | 38.241 | 6.014 |
| Standard Deviation (S.D.) | 0.001 | 2.158 | 0.301 |
| Coefficient of Variation | 0.130 | 5.833 | 5.152 |

Table 5 depicts the SBS and USBS for unsticking the mudcake in the presence of the first commercial spotting fluid composition after a soaking time period of six hours:

TABLE 5

SBS and USBS for the mudcake in the presence of the first commercial spotting fluid composition after 6 hours

| | Fit | SBM (kgf/mm) | USBS (kgf) |
| --- | --- | --- | --- |
| Test 1 | 0.991 | 33.349 | 3.11 |
| Test 2 | 0.992 | 33.186 | 2.87 |
| Test 3 | 0.974 | 35.213 | 2.46 |

TABLE 5-continued

SBS and USBS for the mudcake in the presence of the first
commercial spotting fluid composition after 6 hours

|  | Fit | SBM (kgf/mm) | USBS (kgf) |
| --- | --- | --- | --- |
| Average | 0.99 | 33.92 | 2.81 |
| Standard Deviation (S.D.) | 0.01 | 1.13 | 0.33 |
| Coefficient of Variation | 1.05 | 3.32 | 11.68 |

Table 6 depicts the SBS and USBS for unsticking the mudcake in the presence of the first commercial spotting fluid composition after a soaking time period of sixteen hours:

TABLE 6

SBS and USBS for the mudcake in the presence of the first
commercial spotting fluid composition after 16 hours

|  | Fit | SBM (kgf/mm) | USBS (kgf) |
| --- | --- | --- | --- |
| Test 1 | 0.992 | 17.107 | 1.485 |
| Test 2 | 0.985 | 24.652 | 1.4338 |
| Test 3 | 0.990 | 25.0707 | 1.571 |
| Average | 0.989 | 22.276 | 1.497 |
| Standard Deviation (S.D.) | 0.004 | 4.482 | 0.069 |
| Coefficient of Variation | 0.333 | 20.120 | 4.617 |

Table 7 depicts the SBS and USBS for unsticking the mudcake in the presence of the second commercial spotting fluid composition after a soaking time period of six hours:

TABLE 7

SBS and USBS for the mudcake in the presence of the second
commercial spotting fluid composition after 6 hours

|  | Fit | SBM (kgf/mm) | USBS (kgf) |
| --- | --- | --- | --- |
| Test 1 | 0.983 | 22.348 | 1.262 |
| Test 2 | 0.984 | 21.077 | 1.231 |
| Test 3 | 0.989 | 24.610 | 1.324 |
| Average | 0.985 | 22.678 | 1.272 |
| Standard Deviation (S.D.) | 0.003 | 1.790 | 0.047 |
| Coefficient of Variation | 0.318 | 7.891 | 3.726 |

Table 8 depicts the SBS and USBS for unsticking the mudcake in the presence of the second commercial spotting fluid composition after a soaking time period of sixteen hours:

TABLE 8

SBS and USBS for the mudcake in the presence of the second
commercial spotting fluid composition after 16 hours

|  | Fit | SBM (kgf/mm) | USBS (kgf) |
| --- | --- | --- | --- |
| Test 1 | 0.993 | 28.835 | 1.825 |
| Test 2 | 0.993 | 30.706 | 1.758 |
| Test 3 | 0.994 | 31.739 | 1.653 |
| Average | 0.993 | 30.427 | 1.745 |
| Standard Deviation (S.D.) | 0.001 | 1.472 | 0.087 |
| Coefficient of Variation | 0.083 | 4.839 | 4.962 |

Table 9 depicts the SBS and USBS for unsticking the mudcake in the presence of the alkyl ester spotting fluid composition after a soaking time period of six hours:

TABLE 9

SBS and USBS for the mudcake in the presence of the
alkyl ester spotting fluid composition after 6 hours

|  | Fit | SBM (kgf/mm) | USBS (kgf) |
| --- | --- | --- | --- |
| Test 1 | 0.988 | 25.050 | 1.4827 |
| Test 2 | 0.989 | 26.232 | 1.4519 |
| Test 3 | 0.990 | 26.353 | 1.4073 |
| Average | 0.989 | 25.878 | 1.447 |
| Standard Deviation (S.D.) | 0.001 | 0.720 | 0.038 |
| Coefficient of Variation | 0.084 | 2.783 | 2.619 |

Table 10 depicts the SBS and USBS for unsticking the mudcake in the presence of the alkyl ester spotting fluid composition after a soaking time period of sixteen hours:

TABLE 10

SBS and USBS for the mudcake in the presence of the
alkyl ester spotting fluid composition after 16 hours

|  | Fit | SBM (kgf/mm) | USBS (kgf) |
| --- | --- | --- | --- |
| Test 1 | 0.970 | 28.261 | 1.6025 |
| Test 2 | 0.991 | 25.387 | 1.6074 |
| Test 3 | 0.989 | 25.434 | 1.6315 |
| Average | 0.983 | 26.361 | 1.614 |
| Standard Deviation (S.D.) | 0.012 | 1.646 | 0.016 |
| Coefficient of Variation | 1.180 | 6.245 | 0.962 |

Figure 7:
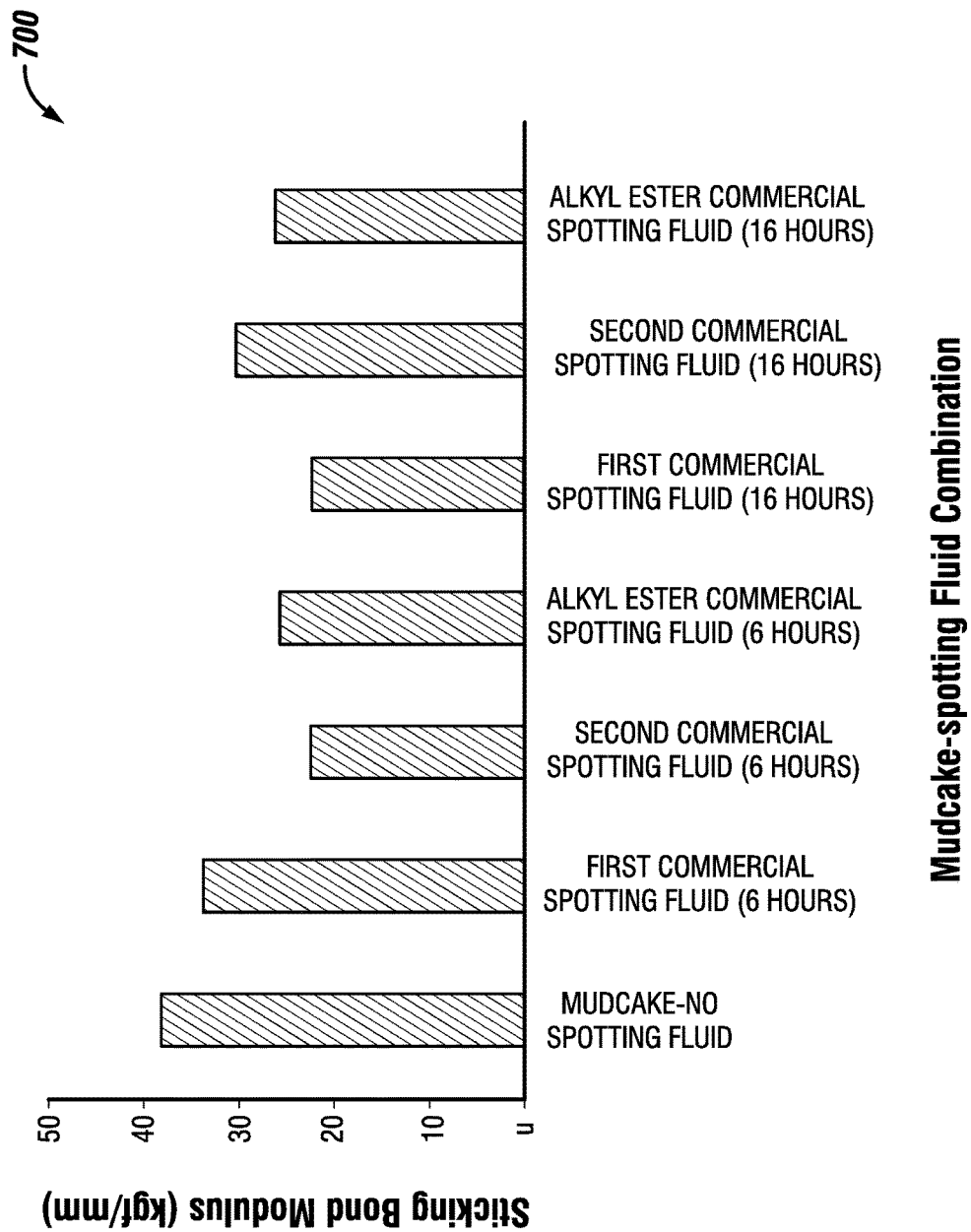
FIG. 7 is a bar graph showing the sticking bond modulus of a mudcake without interaction with any spotting fluids and the sticking bond moduli associated with commercial spotting fluid compositions and an alkyl ester spotting fluid composition.
Figure 8:
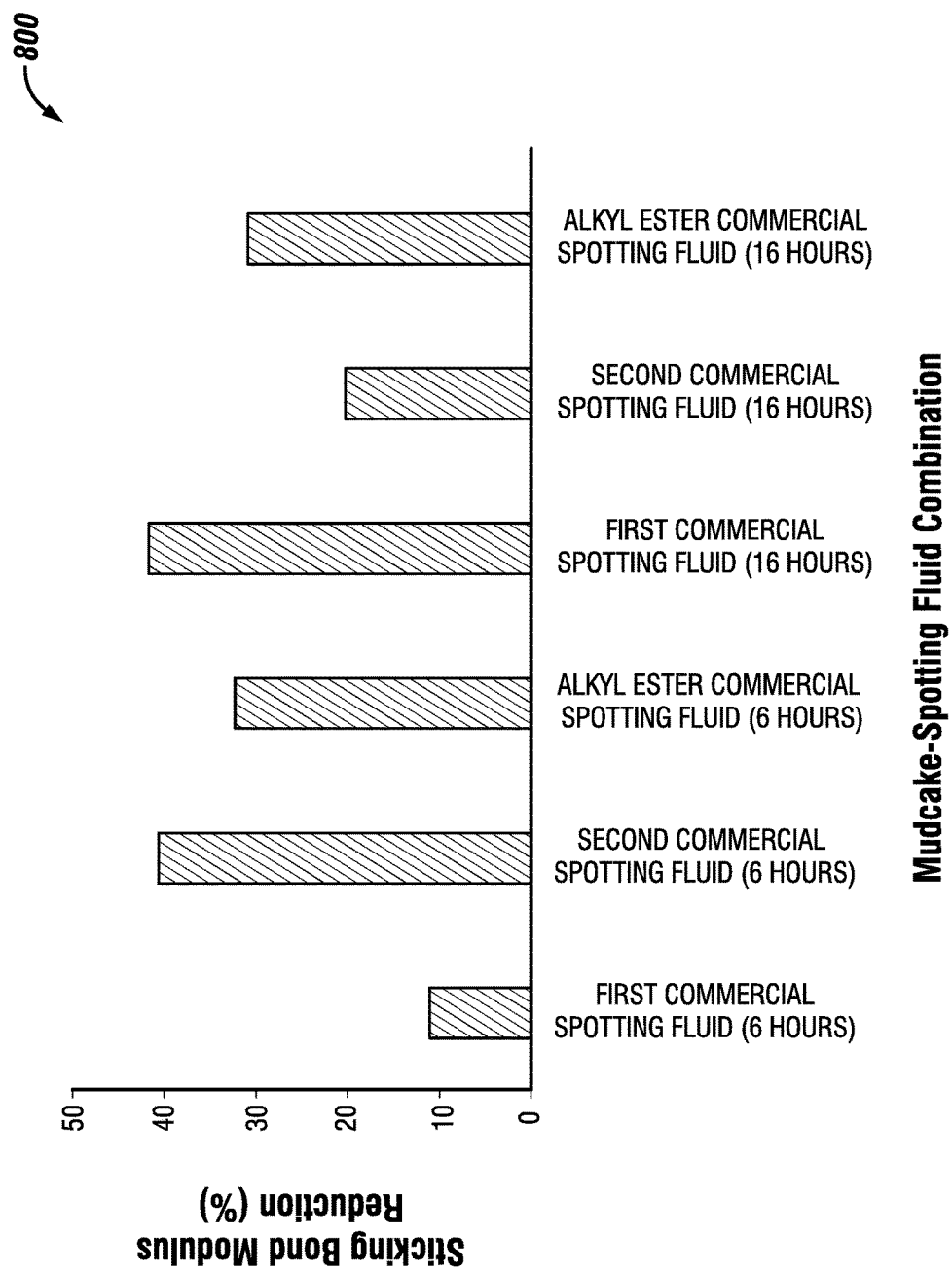
FIG. 8 is a bar graph showing a comparison of the sticking bond modulus of a mudcake without interaction with any spotting fluids and the sticking bond moduli associated with commercial spotting fluid compositions and an alkyl ester spotting fluid composition.

FIGS. 7-10 are various bar graphs comparing the SBM and USBS described in Tables 7-10. FIG. 7 depicts a bar graph 700 that shows a comparison of the average SBMs (in kgf/mm) of the mudcake without interaction with any spotting fluids and for the first commercial spotting fluid composition, the second commercial spotting fluid composition, and the alkyl ester spotting fluid composition. FIG. 8 depicts a bar graph 800 illustrating the percentage reduction in SBM associated with the alkyl ester and the percentage reduction in SBM associated with the commercial spotting fluids, as compared to the SBM for the mudcake without interaction with any spotting fluid.

As shown in FIG. 7, each of the tested spotting fluids reduce the sticking bond modulus of the mudcake due to the interactions of the spotting fluids and the effect on the sticking bonds between the mudcake and the spherical foot. As also shown in FIGS. 7 and 8, the alkyl ester spotting fluid composition showed a larger reduction in SBM values for a six hour soaking time period than the first commercial spotting fluid while having nearly comparable reduction in SBM values to the second commercial spotting fluid. For example, the SBM value associated with the alkyl ester spotting fluid composition is nearly equal to the SBM value associated with the second commercial spotting fluid composition. Additionally, as shown in FIG. 7, the second commercial spotting fluid showed an increased in SBM after the sixteen hour soaking time period, indicating that the second commercial spotting fluid may have a time dependent stiffening effect that causes an increase in SBM. Consequently, using the second commercial spotting fluid and soaking beyond an optimal time period may increase the difficulty of recovering a stuck pipe. In contrast, the alkyl ester spotting fluid composition showed no time-dependent stiffening effect and thus showed superior long-term behavior as compared to the second commercial spotting fluid. As shown supra, the alkyl ester spotting fluid composition caused a degradation and weakening of sticking bonds within a relatively short time period (the six hour soaking time period), showing superior short-term behavior as compared to the first commercial spotting fluid composition.

Figure 9:
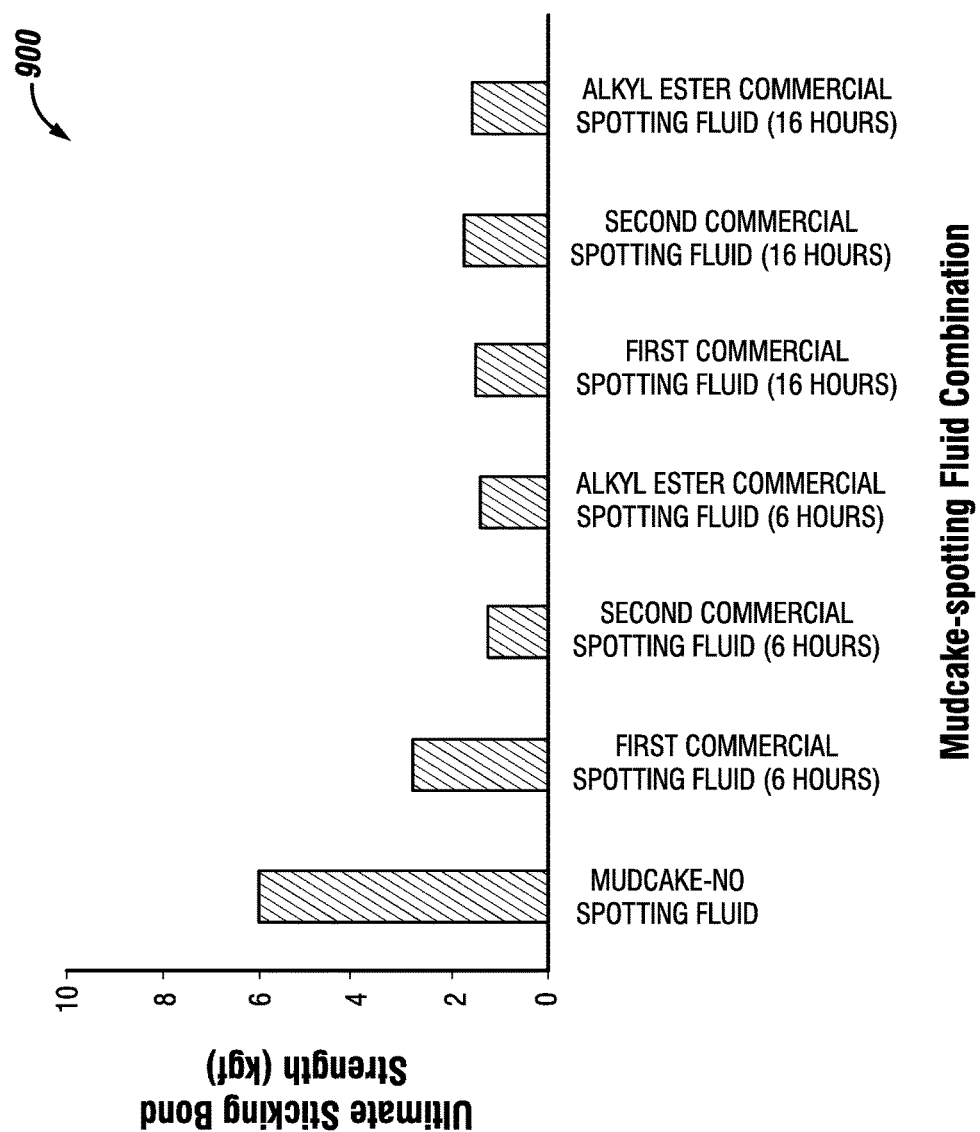
FIG. 9 is a bar graph showing the ultimate sticking bond strength of a mudcake without interaction with any spotting fluids and the ultimate sticking bond strengths associated with commercial spotting fluid compositions and an alkyl ester spotting fluid composition.
Figure 10:
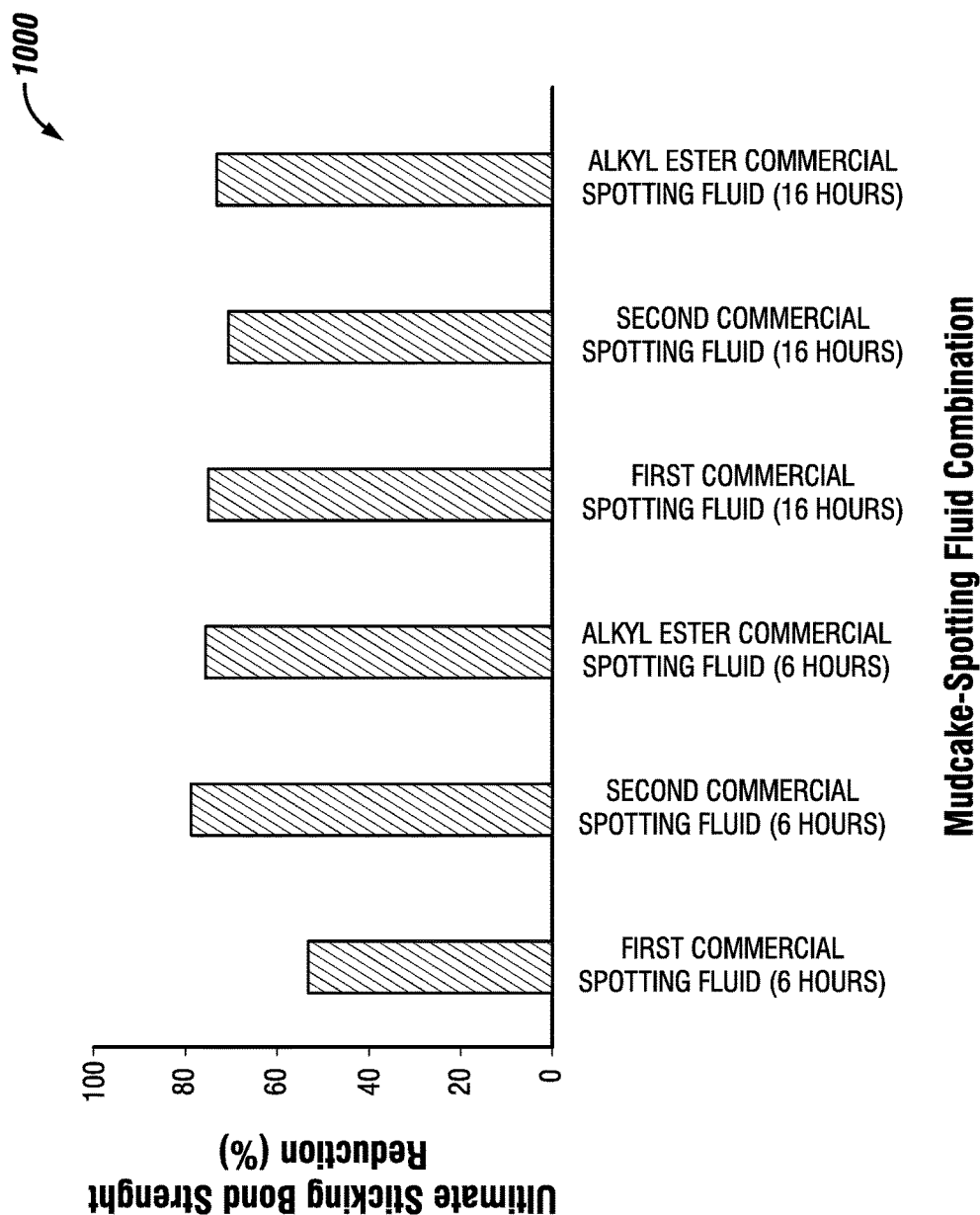
FIG. 10 is a bar graph showing a comparison of the ultimate sticking bond strength of a mudcake without interaction with any spotting fluids and the ultimate sticking bond strengths associated with commercial spotting fluid compositions and an alkyl ester spotting fluid composition.

FIG. 9 depicts a bar graph 900 that shows a comparison of the average USBS's (in kgf) of the mudcake without interaction with any spotting fluids and for the first commercial spotting fluid composition, the second commercial spotting fluid composition, and the alkyl ester spotting fluid composition. FIG. 10 depicts a bar graph 1000 illustrating the percentage reduction in USBS associated with the alkyl ester and the percentage reduction in USBS associated with the commercial spotting fluids, as compared to the USBS for the mudcake without interaction with any spotting fluid.

As shown in FIG. 9, each of the tested spotting fluids reduces the USBS of the mudcake due to the interactions of the spotting fluids and the effect on the sticking bonds between the mudcake and the spherical foot. As also shown in FIGS. 9 and 10, the alkyl ester spotting fluid composition showed a larger reduction in USBS values for a six hour soaking time period than the first commercial spotting fluid while having nearly comparable reduction in USBS values to the second commercial spotting fluid. For example, the USBS value associated with the alkyl ester spotting fluid composition is nearly equal to the USBS value associated with the second commercial spotting fluid composition. Additionally, as shown in FIG. 9, the second commercial spotting fluid showed an increased in USBS after the sixteen hour soaking time period. The increase in both SBM and USBS showed by the second commercial spotting fluid confirms that the second commercial spotting fluid composition has a time-dependent stiffening and hardening effect. Consequently, a soaking time period greater than an optimal soaking time period may increase the difficulty of recovering the stuck pipe. Here again, the USBS values shown in FIGS. 9 and 10 demonstrate that the alkyl ester spotting fluid composition has no time dependent stiffening and hardening effect and has superior long-term behavior as compared to the second commercial spotting fluid. Similarly, the USBS values also confirm that the alkyl ester spotting fluid composition has improved short-term behavior as compared to the first commercial spotting fluid.

Alkyl Ester Spotting Fluid Compositions

In some embodiments, an alkyl ester spotting fluid composition can include an invert emulsion having an alkyl ester as the external phase and water as the internal phase. The internal phase can include freshwater (water having relatively low (that is, less than 5000 ppm) concentrations of total dissolved solids) or seawater (for example, water having a salinity in the range of about 33,000 to about 37,000 parts-per-million (ppm)). In some embodiments, the internal phase may include artificial brines, natural brines, brackish water, or formation water. In some embodiments, the volumetric ratio of alkyl ester to water can be in the range of about 95:5 to about 60:40. In some embodiments, the alkyl ester can include an oleic sunflower oil ester (for example, a low oleic sunflower oil ester (70% or less oleic acid) or a high oleic sunflower oil ester (greater than 70% oleic acid), a canola oil ester, a jojoba oil ester, or a castor oil ester. In some embodiments, the alkyl ester can be produced from a vegetable oil such as sunflower oil, jojoba oil, canola oil, castor oil, palm oil, soybean oil, or other suitable vegetable oils.

In some embodiments, the alkyl ester spotting fluid composition can include an invert emulsion having an alkyl ester as the external phase and water as the internal phase, and an emulsifier. In some embodiments, the emulsifier can be in the range of about 8% to about 9% by volume. In some embodiments, the emulsifier can include a commercial pipe-freeing agent. In some embodiments, the emulsifier can include EZ Spot® manufactured by Halliburton of Houston, Tex., USA. In some embodiments, the emulsifier can include other suitable emulsifiers, such as Pipe-Lax® manufactured by M-I Swaco of Pleasanton, Tex., USA, EZ MUL® manufactured by Halliburton of Houston, Tex., USA, XPLOR® 1653 and XPLOR® 1654 manufactured by Georgia-Pacific of Atlanta, Ga., USA, GLO PEMUL 1000 manufactured by Global Drilling Fluids and Chemical Limited of Gujarat, India, and MUL-EASE I and U-MUL-22 manufactured by Unique Drilling Fluids of Dallas, Tex. In some embodiments, the alkyl ester spotting fluid composition can include 64% by volume of an alkyl ester, 8% by volume of an emulsifier, and 28% by volume of water.

In some embodiments, the alkyl ester spotting fluid composition can include a weighting agent, such as barite, calcium carbonate, hausmannite ore, or other suitable weighting agents, to from a spotting fluid composition having a desired weight. In some embodiments, the weighting agent added to the alkyl ester spotting fluid composition can include Micromax® weight additives manufactured by Halliburton of Houston, Tex., USA.

In some embodiments, the alkyl ester spotting fluid composition has a 96 hour $LC_{50}$ of greater than 100,000 parts-per-million (ppm). As used herein, $LC_{50}$ refers to the lethal concentration (LC) of a chemical or additive in water which cases the death of 50% or a group of test subjects. The alkyl ester spotting fluid composition described in the disclosure can be biodegradable, environmentally friendly, and non-toxic. For example, vegetable esters produced from vegetable oils used in the alkyl ester spotting fluid composition may be biodegradable, eco-friendly, and non-toxic. Moreover, due to the biodegradable and environmentally friendly properties of the alkyl ester spotting fluid, the alkyl ester spotting fluid may not be removed from a mud system after recovering the stuck pipe. In some embodiments, the alkyl ester spotting fluid composition can be incorporated in a water-based mud without negatively impacting the environmental characteristics of the water-based mud. The elimination of the removal phase of the alkyl ester spotting fluid composition will reduce the time and cost associated with freeing a differentially stuck pipe.

In some embodiments, the alkyl ester spotting fluid composition can be added to a circulating mud volume in a range of about 2% to about 4% by volume of the total operating mud system. For example, in some embodiments, about 50 bbl to about 100 bbl of alkyl ester spotting fluid pill can be added to a circulating mud volume of 2500 barrels or more. Additionally, the addition of about 2% to about 4% by volume of the alkyl ester spotting fluid composition can improve the lubricity of a water-based mud and, thus, aid in reducing torque and drag problems in deviated and horizontal boreholes without an adverse effect on the surrounding environment.

Figure 11:
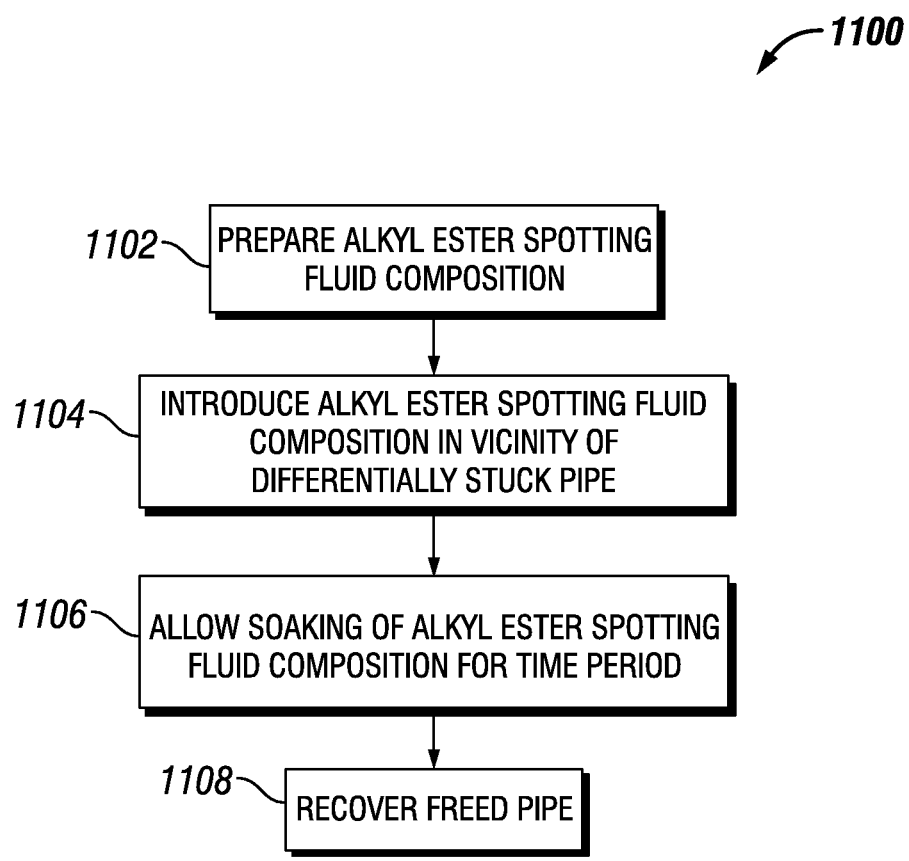
FIG. 11 is a flowchart of a process for freeing differentially stuck pipe using an alkyl ester spotting fluid composition in accordance with an embodiment of the disclosure.

FIG. 11 depicts a process 1100 for using an alkyl ester spotting fluid composition in accordance with an embodiment of the disclosure. Initially, the alkyl ester spotting fluid composition can be prepared (block 1102), such as by preparing an invert emulsion having the alkyl ester as the external phase and water as an internal phase. In some embodiments, preparing the alkyl ester spotting fluid composition can include mixing the invert emulsion with an emulsifier. In some embodiments, preparing the alkyl ester spotting fluid composition can include mixing the invert emulsion (and in some embodiments, an emulsifier) with a weighting agent.

Next, the spotting fluid composition having an invert emulsion of an alkyl ester and water can be introduced (for example, pumping downhole) in the vicinity of a differentially stuck pipe (block 1104). For example, the alkyl ester spotting fluid compositing can be added to a mud system and circulated downhole with the mud. In some embodiments, the alkyl ester spotting fluid composition can be added in the range of about 2% of 4% by volume of the total circulating mud system volume.

In some embodiments, the spotting fluid composition can be allowed to soak for a time period (block 1106). For example, the spotting fluid composition can interact with the material (for example, mudcake) surrounding the stuck pipe.

After a soaking time period, he freed pipe can then be recovered (block 1108), such as by removing the freed pipe from the wellbore. In some embodiments, the alkyl ester spotting compositing may not be removed from the mud system after recovering the stuck pipe. Thus, in some embodiments a process for removing a stuck pipe using the alkyl ester spotting fluid composition can be performed without removing the alkyl ester from the mud system.

Ranges may be expressed in the disclosure as from about one particular value, to about another particular value, or both. When such a range is expressed, it is to be understood that another embodiment is from the one particular value, to the other particular value, or both, along with all combinations within said range.

Throughout this application, where patents or publications are referenced, the disclosures of these references in their entireties are intended to be incorporated by reference into this application, in order to more fully describe the state of the art to which the disclosure pertains, except when these references contradict the statements made in the disclosure.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method of freeing differentially stuck pipe in a well, comprising:
    introducing a spotting fluid composition in the vicinity of a portion of differentially stuck pipe, such that the spotting fluid contacts a material surrounding the portion of differentially stuck pipe, the spotting fluid composition comprising:
        an emulsifier;
        an invert emulsion consisting of:
            an external phase comprising an alkyl ester produced from the esterification of a vegetable oil, wherein the alkyl ester comprises an oleic sunflower oil ester comprising greater than 70% oleic acid; and
            an internal phase comprising water.

2. The method of claim 1, wherein the external phase consists of the alkyl ester and the internal phase consists of water.

3. The method of claim 1, comprising allowing the spotting fluid composition to interact with the material surrounding the portion of differentially stuck pipe over a time period.

4. The method of claim 1, comprising adding the spotting fluid composition to a mud system configured to circulate a drilling mud.

5. The method of claim 1, wherein the spotting fluid composition is added to the mud system in a range of 2% to 4% by volume.

6. The method of claim 4, comprising:
    recovering the stuck pipe; and
    retaining the spotting fluid composition in the mud system after recovering the stuck pipe.

7. The method of claim 1, wherein a volumetric ratio of the alkyl ester to water is in a range of 95:5 to 60:40.

8. The method of claim 1, wherein the emulsifier comprises at least 8% by volume.

9. The method of claim 1, comprising a weighting agent.

* * * * *